March 11, 1969 R. H. BEVILLE ET AL 3,432,082

COMMON CAPSTAN MOUNTING SYSTEM

Filed Jan. 5, 1967 Sheet 1 of 2

INVENTORS
ROSS H. BEVILLE
WAYNE E. SCHOBER
DAVID R. DURST

BY Semmes & Semmes
ATTORNEYS

INVENTORS
ROSS H. BEVILLE
WAYNE E. SCHOBER
DAVID R. DURST

BY Semmes & Semmes
ATTORNEYS

1

3,432,082
COMMON CAPSTAN MOUNTING SYSTEM

Ross H. Beville, Bethesda, Md., Wayne E. Schober, Minneapolis, Minn., and David R. Durst, Gaithersburg, Md., assignors to Broadcast Electronics, Inc., Silver Spring, Md., a corporation of Maryland Filed Jan. 5, 1967, Ser. No. 611,212
U.S. Cl. 226—110 13 Claims
Int. Cl. B65h 17/20

ABSTRACT OF THE DISCLOSURE

This is a system of aligning and retaining in precision alignment a rotary drive means such as may be used for plural power take-offs. In its broadest sense it is useful in any transmission system; but it is especially adapted to driving multiple cartridge tapes with a single capstan characterized by being precisely aligned with the pinch roller associated with each cartridge.

In designing a single rotary shaft hereinafter referred to as capstan for driving a group of "stacked" cartridge tapes, it is essential that the capstan be precisely aligned along its entire length with respect to the pinch roller and tape associated with each cartridge. Although it would seem that a capstan journalled at each end would be sufficient, the unusually large pressures exerted against the capstan by the in-line pinch rollers creates distortion of a magnitude necessitating that the shaft be supported intermediate its ends to thus ensure accurate alignment throughout its length.

Accordingly, an object of the present invention is to enable a plurality of cartridge tapes to be driven by a single or common rotary capstan, without distortion of the capstan.

Another object of the present invention is to ensure accurate alignment of a single capstan for driving a plurality of tapes by supporting the capstan intermediate its ends, particularly between each tape deck and related cartridge.

Still another object of the present invention is to permit a plurality of tape cartridge decks to be oriented for sliding movement into and out of a tape apparatus employing a common capstan.

Still further objects of the present invention will become apparent from the ensuing specification and attached drawings, wherein.

Figure 1:
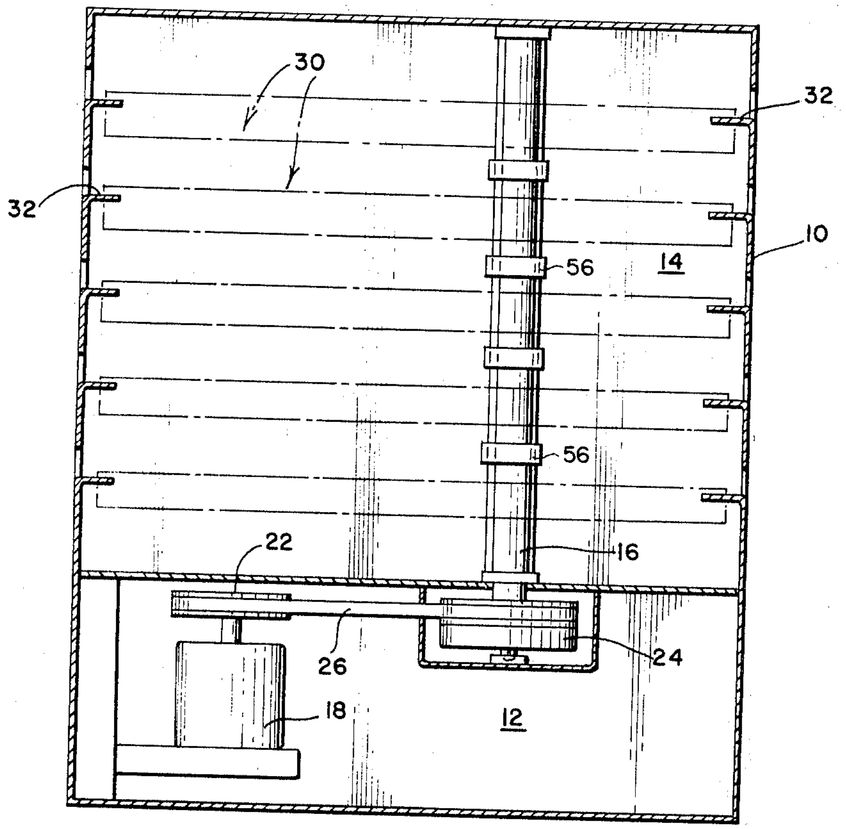
FIG. 1 is a sectional view of the tap apparatus illustrating stacked tape decks and common driving capstan.

As seen in FIG. 1, the tape apparatus of the present invention includes a housing 10 divided into a lower compartment 12 in which the capstan driving mechanism is located and an upper compartment 14 containing the tape cartridges and decks together with the common capstan for driving the tapes.

More particularly, the reference numeral 16 designates the single or common capstan of the tape apparatus of the present invention which may, of course, be driven in any conventional manner. As illustrated in FIG. 1, capstan 16 is driven by motor 18 through pulleys 22 and 24 and belt 26. Manifestly, varying tape speeds may be accommodated by conventional rearrangement of pulley diameters.

2

Figure 2:
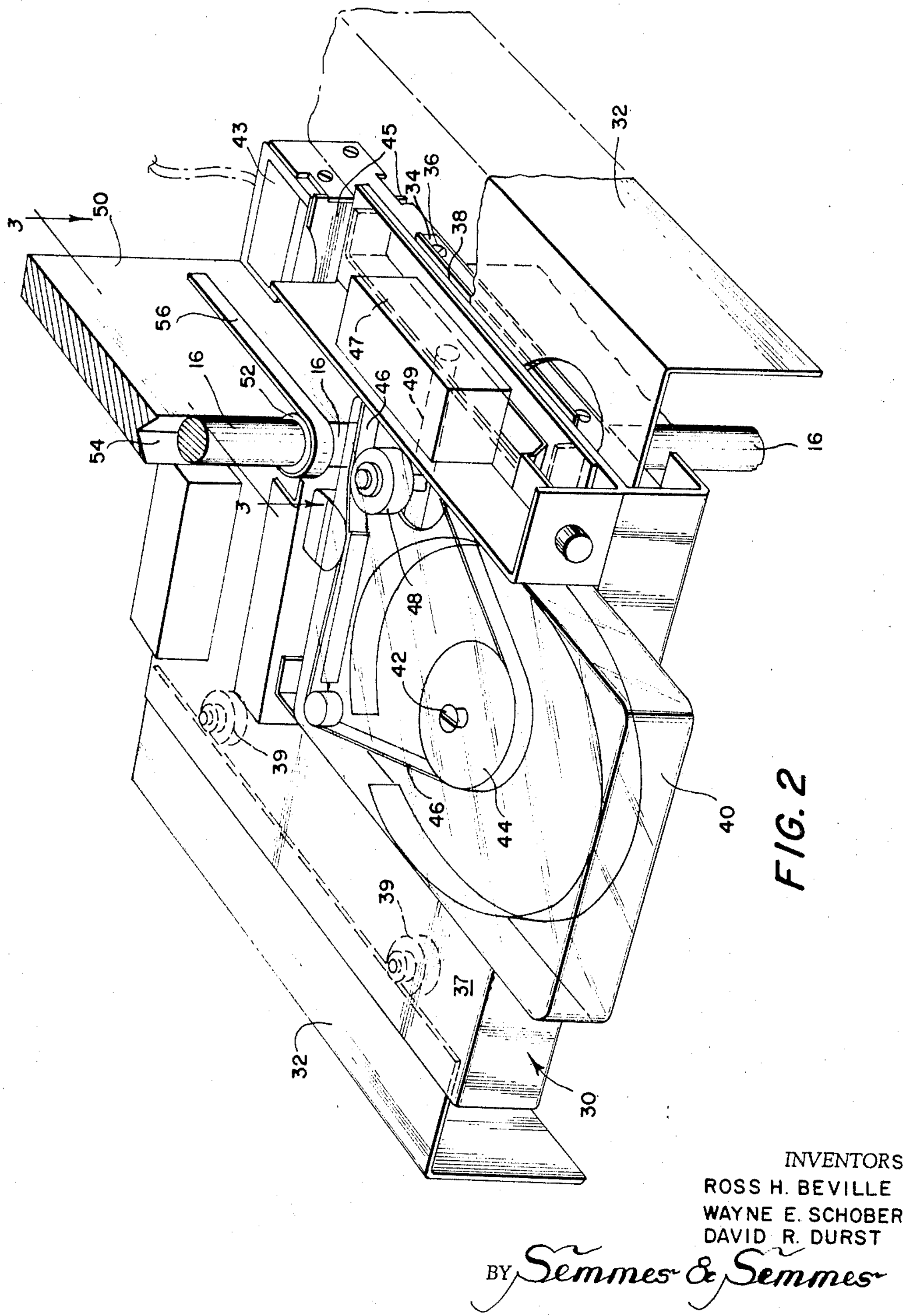
FIG. 2 is a perspective view illustrating a single tape deck and corresponding tape cartridge in position for engagement by the common capstan, together with the system permitting sliding movement of the deck within apparatus.

Within upper compartment 14 are located a plurality of "stacked" tape decks 30 arranged for sliding movement into and out of housing 10, the details of a single such deck being shown in FIG. 2. The orientation of decks 30 for sliding movement is accomplished with the use of guide members 32, which may for example be accurately punched from the side walls of housing 10. In conjunction therewith, each deck 30 is provided on one side thereof with a generally L-shaped member 34 which may, for example, be attached to deck 30 with screws 36. In this manner, a slot 38 is defined within which the right hand guide members 32 fit. In similar manner, the left hand guide members 32 fit between the top plate 37 of deck 30 and guides 39.

Cartridges 40 each include the conventional shaft 42 which receives a reel 44 having endless magnetic tape 46 actuated for movement as pinch roller 48 is positioned in driving relation on the opposite side of tape 46 from capstan 16. Upon energizing solenoid 43, armature 45 and arm 47 are moved toward solenoid 43 and pinch roller 48, fixed thereto through arm 49, is moved into driving contact with tape 46 and common capstan 16. Naturally, other techniques may be employed for urging pinch rollers 48 into driving position, such as that disclosed in U.S. Patent 3,083,269 and incorporated herein by reference. Further discussion is not considered necessary, the method of moving pinch rollers 48 not constituting a part of the present invention.

Figure 3:
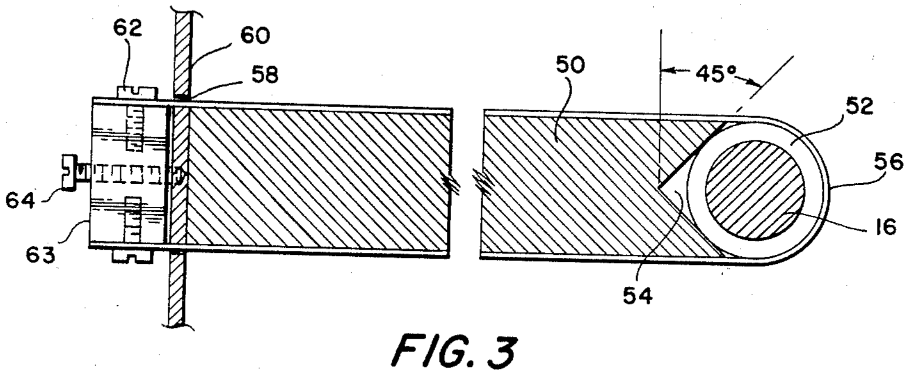
FIG. 3 is a sectional view taken along line 3—3 of FIG. 2 illustrating the details of journalling the common driving capstan between each of the decks.

Although shaft 16 is journalled at each end in conventional manner, proper alignment is ensured in the present invention by providing support intermediate the ends of capstan 16 with the use of block 50 and bearings 52. As seen in FIG. 3, block 50 includes a V-shaped groove 54 running the entire length thereof formed at an angle of 90°. Obviously, the groove 54 may suitably define any angle of less than 180°. Within groove 54 are mounted bearings 52 spaced between decks 30 and secured in place with groove 54 with straps 56. Each strap 56 passes backwardly along the sides of V block 50, as seen in FIG. 3, passes through openings 58 within the back 60 of housing 10 and the ends thereof are fastened with screws 62 to block 63. Screw 64 serves to adjust the tension of strap 56 thereby holding the bearings 52 securely in place against the V-groove 54 in block 50.

One of the salient features of the invention resides in the facile removal of bearings. This is accomplished by simply relieving the tension strap 56 (turning screw 64 counterclockwise) and shifting the bearings along the capstan to its end and removing. A suitable aperture on the top of the housing 10 is provided for this purpose. Otherwise a removable top for the housing will permit access.

Manifestly, variation in configuration and arrangement of parts may be envisioned without departing from the spirit and scope of invention as defined by the subjoined claims.

We claim:

1. A tape apparatus, comprising:
(A) a plurality of tape decks each capable of including a tape cartridge;
(B) a single capstan, together with means for driving same;
(C) a plurality of pinch rollers associated with each of said decks;
(D) means for urging selected pinch rollers into driving relationship with respect to said capstan to drive a selected tape;
(E) and means for aligning said capstan at selected points along its length.

2. A tape apparatus as in claim 1, wherein said means for aligning said capstan includes a plurality of supports surrounding said capstan, said supports being located in close proximity to each of said tape drive points, together with means securing said supports to said apparatus.

3. A tape appartus as in claim 2, wherein said means for securing said supports includes a block located near said capstan, said block securing said supports in spaced relationship along said capstan.

4. A tape apparatus as in claim 3, wherein said block includes a generally V-shaped portion within which said supports are mounted, together with straps securing said supports within said V-shaped portion.

5. A tape apparatus as in claim 4, including means for adjusting the tension of said straps.

6. A tape apparatus as in claim 5, wherein said supports are bearings.

7. A tape apparatus as in claim 6, wherein said V-shaped portion defines an angle less than 180°.

8. A tape apparatus as in claim 1, including a plurality of decks upon which said pinch rollers are mounted together with means removably mounting said decks within said apparatus.

9. A tape apparatus as in claim 8, wherein said means removably mounting said decks includes a plurality of guides spaced along said apparatus together with corresponding guides on said decks.

10. A tape apparatus as in claim 9, wherein said decks are arranged in multiple parallel relationship adjacent the capstan.

11. A mounting system, comprising:

(A) a rotating capstan;

(B) at least two bearings surrounding said capstan at preselected points;

(C) a unitary block operatively associated with said capstan, said block defining a V-groove within which said bearings are mounted; and (D) means securing said bearings within said groove;

(E) drive means operatively engaging the capstan.

12. A mounting system as in claim 11, wherein said means securing said bearings within said groove are straps surrounding portions of said bearings and block together with means for adjusting the tension of said straps.

13. A tape apparatus, comprising:

(A) a plurality of decks including pinch rollers, together with means removably mounting said decks within said apparatus, said means including first guides spaced along said apparatus together with corresponding second guides on said decks;

(B) at least one capstan, together with means for driving same; and (C) means for urging said pinch rollers into driving relationship with respect to said capstan.

References Cited

UNITED STATES PATENTS

| | | | |
|---|---|---|---|
| 3,126,162 | 3/1964 | MacKenzie ------ | 226—110 X |
| 3,147,901 | 9/1964 | Nordman et al. ---- | 226—194 X |
| 3,221,962 | 12/1965 | Anderson ---------- | 226—109 |

ALLEN N. KNOWLES, *Primary Examiner.*

U.S. Cl. X.R.

226—177, 185, 194